United States Patent
Chandalia

(10) Patent No.: US 10,679,247 B1
(45) Date of Patent: *Jun. 9, 2020

(54) INCREMENTAL MODEL TRAINING FOR ADVERTISEMENT TARGETING USING STREAMING DATA

(71) Applicant: Quantcast Corporation, San Francisco, CA (US)

(72) Inventor: Gaurav Chandalia, Sunnyvale, CA (US)

(73) Assignee: Quantcast Corporation, San Francisco, CA (US)

( * ) Notice: Subject to any disclaimer, the term of this patent is extended or adjusted under 35 U.S.C. 154(b) by 1106 days.

This patent is subject to a terminal disclaimer.

(21) Appl. No.: 15/087,341

(22) Filed: Mar. 31, 2016

Related U.S. Application Data

(63) Continuation of application No. 14/950,401, filed on Nov. 24, 2015, now Pat. No. 9,384,451, which is a
(Continued)

(51) Int. Cl.
*G06Q 30/02* (2012.01)
*G06Q 10/06* (2012.01)
(Continued)

(52) U.S. Cl.
CPC ........... *G06Q 30/0254* (2013.01); *G06N 5/04* (2013.01); *G06N 20/00* (2019.01); *G06Q 10/067* (2013.01)

(58) Field of Classification Search
CPC ........ G06F 15/18; G06N 99/005; G06N 5/00; G06N 5/02; G06N 20/00; G06N 5/04;
(Continued)

(56) References Cited

U.S. PATENT DOCUMENTS

2004/0218801 A1* 11/2004 Houle ................ G06K 9/00154
382/137
2005/0071218 A1* 3/2005 Lin ........................ G06Q 30/00
705/14.44
(Continued)

OTHER PUBLICATIONS

Rubens et al. "Active Learning in Recommender Systems." Recommender Systems Handbook. Ed. Ricci et alia. Springer Science + Business Media, 2010. pp. 735-767.
(Continued)

*Primary Examiner* — Alexey Shmatov
*Assistant Examiner* — Robert Bejcek, II
(74) *Attorney, Agent, or Firm* — Robin W. Reasoner; Andrea Wheeler

(57) ABSTRACT

Incremental model training for advertisement targeting is performed using streaming data. A model for targeting advertisements of an advertising campaign is initialized. A data stream including data corresponding to converters and data corresponding to non-converters is received. The model is then applied to the data corresponding to the converter and data corresponding to the non-converter (or other ratio of converter to non-converters) to obtain a predicted score for each. The predicted score is compared to the observed score (e.g., an observed score of 1 for a converter, and 0 for a non-converter). The difference between the predicted and observed scores is computed, and the model is incrementally updated based on this difference. Models can optionally be built separately on multiple modeling servers that are geographically dispersed in order to support bidding on advertising opportunities in a real-time bidding environment.

19 Claims, 4 Drawing Sheets

Related U.S. Application Data continuation of application No. 13/480,315, filed on May 24, 2012, now Pat. No. 9,224,101.

(51) Int. Cl.
   *G06N 5/04* (2006.01)
   *G06N 20/00* (2019.01)

(58) Field of Classification Search
   CPC . G06K 9/6256; G06Q 30/0254; G06Q 10/067
   See application file for complete search history.

(56) References Cited

U.S. PATENT DOCUMENTS

| | | |
|---|---|---|
| 2007/0156887 A1 | 7/2007 | Wright et al. |
| 2010/0198772 A1 | 8/2010 | Silverman et al. |
| 2010/0228636 A1 | 9/2010 | Silverman et al. |
| 2010/0257117 A1* | 10/2010 | Shvadron ............... G06Q 10/04 705/36 R |
| 2011/0040636 A1 | 2/2011 | Simmons et al. |
| 2012/0023043 A1 | 1/2012 | Cetin et al. |
| 2012/0054040 A1* | 3/2012 | Bagherjeiran ......... G06Q 30/00 705/14.66 |

OTHER PUBLICATIONS

Li, Xiao-Bai. Data Reduction via Adaptive Sampling, Communications in Information and Systems, vol. 2, No. 1, pp. 53-68, Jun. 2002.

Deane et al., Ontological Analysis of Web Surf History to Maximize the Click-Through Probability of Web Advertisements, Decision Support Systems vol. 47, pp. 364-373, 2009.

Chen et al. Factor Modeling for Advertisement Targeting. Advances in Neural Information Processing Systems 22 (NIPS 2009). 2009.

Wen et al. Incremental pairwise discriminant analysis based visual tracking. Neurocomputing 74(2010)428-438.

Fain et al., Sponsored Search: A Brief History, Bulletin of American Society for Information Science and Technology, pp. 12-13, Dec./Jan. 2006.

Attenberg, J. et al., "Collaborative Email-Spam Filtering with the Hashing-Trick," CEAS 2009, Sixth Conference on Email and Anti-Spam, Jul. 16-17, 2009, Mountain View, CA, 4 pages.

United States Office Action, U.S. Appl. No. 13/480,315, dated Dec. 24, 2014, 12 pages.

United States Office Action, U.S. Appl. No. 13/480,315, dated Jun. 18, 2014, 12 pages.

\* cited by examiner

INCREMENTAL MODEL TRAINING FOR ADVERTISEMENT TARGETING USING STREAMING DATA

CROSS-REFERENCE TO RELATED APPLICATIONS

This application is a continuation of U.S. Non-Provisional application Ser. No. 14/950,401 entitled "Incremental Model Training For Advertisement Targeting Using Streaming Data" by Gaurav Chandalia, filed on Nov. 24, 2015, which is a continuation of U.S. Non-Provisional application Ser. No. 13/480,315 entitled "Incremental Model Training For Advertisement Targeting Using Streaming Data" by Gaurav Chandalia, filed on May 24, 2012, now U.S. Pat. No. 9,224,101, which are hereby incorporated by reference in their entirety.

BACKGROUND

1. Technical Field

This invention pertains in general to Internet advertising and in particular to methods of incrementally training models for advertisement targeting using streaming data.

2. Description of Related Art

In a real-time bidding environment of an Internet advertisement exchange, a potential advertiser who may want to bid on an advertisement opportunity has a very short period of time to determine whether the characteristics of the advertisement opportunity make the advertisement opportunity valuable enough to submit a bid. Characteristics of the advertisement opportunity include the URL where the ad will appear and the dimensions of the ad slot. In addition, some of the most important characteristics of the advertisement opportunity include the features that are known and/or can be inferred about the user who would view an advertisement that fills the advertisement opportunity. Such features can be determined based at least in part on a consumption history associated with the user.

In general, advertising campaign managers are seeking to maximize the number of conversions for an advertising campaign. A conversion occurs when a user takes an action deemed desirable by the advertiser, such as buying an advertised product, visiting a website, signing up for a service, etc. The precise actions that define a conversion can be set by the advertising campaign manager. By analyzing features from the consumption histories of converters versus non-converters, models can be developed to predict whether a user is likely to become a converter. Such models can be applied in the real-time bidding environment of an Internet advertising exchange to predict whether the user who would view an advertisement that fills the advertisement opportunity is likely to convert. In other words, by applying a model to a consumption history, the advertiser can estimate the likelihood that the user who would view the advertisement would become a converter, and the more likely it is that the user would convert, the more valuable the advertising opportunity is to the advertiser. Thus, an advertiser can determine whether the advertisement opportunity is valuable enough to the advertising campaign to submit a bid and to determine an amount of the bid to submit.

Although the benefits described above of using models to predict whether a user is likely to become a converter are well-recognized in the field, there are many challenges to the successful implementation and use of models. For example, models are most useful when they can capitalize on quickly developing and subsiding trends in user behavior, but for convenience, most models are built from stale data that by definition are not responsive to such trends. In addition, most models are built from vast repositories of data that require significant re-processing whenever an update to the model is required, thus further delaying the implementation of the updated model.

SUMMARY

Embodiments of the invention include a method, a non-transitory computer readable storage medium and a system for performing incremental model training for advertisement targeting using streaming data. A model for targeting advertisements of an advertising campaign is initialized. A data stream including data corresponding to converters and data corresponding to non-converters is received. The data corresponding to converters and data corresponding to non-converters are sampled from the data stream. The model is then applied to data corresponding to the converter and data corresponding to the non-converter (or other ratio of converter to non-converters) to obtain a predicted score for each. The predicted score is compared to the observed score (e.g., an observed score of 1 for a converter, and 0 for a non-converter). The difference between the predicted and observed scores is computed, and the model is incrementally updated based on this difference.

Models can optionally be built separately on multiple modeling servers that are placed in multiple geographically distributed locations. This configuration minimizes network latency between the servers and advertising exchanges which provide advertising bidding opportunities in a real-time bidding environment and can also provide redundant processing capacity for managing traffic spikes and network failures. Optionally, multiple servers may be placed in one location to support using an array of inexpensive processors of lower quality instead of fewer expensive processors of higher quality. Models on the servers can be incrementally updated responsive to the stream of converter and non-converter data that is received by the respective servers. Periodically, to prevent the models at the various servers from diverging too greatly and to ensure that all models are benefiting from recent improvements to the models, the models are optionally combined and redistributed to the servers.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide the ability to incrementally update a model for use in targeting advertisements with streaming data. As data is acquired over time, a model can be incrementally updated rather than rebuilt from scratch. Thus, there is no need to re-access and re-process data that was already incorporated into the model. This leads to significant savings in the amount of processing resources consumed and the amount of storage space in data buffers needed to support incrementally updating the model. Thus, the freshest models can be quickly applied.

Embodiments of the invention are described below in the context of a real-time bidding advertisement exchange for opportunities to display advertisements to users through their web browsers. It is noted that similar techniques as those described below can be used to incrementally update models for use in targeting advertisements in the context of other kinds of auctions and exchanges systems, for use with browser-based advertisements or other types of networked media as well. Such techniques are particularly useful where rapid decisions regarding advertisement opportunities are desirable.

Figure 1:
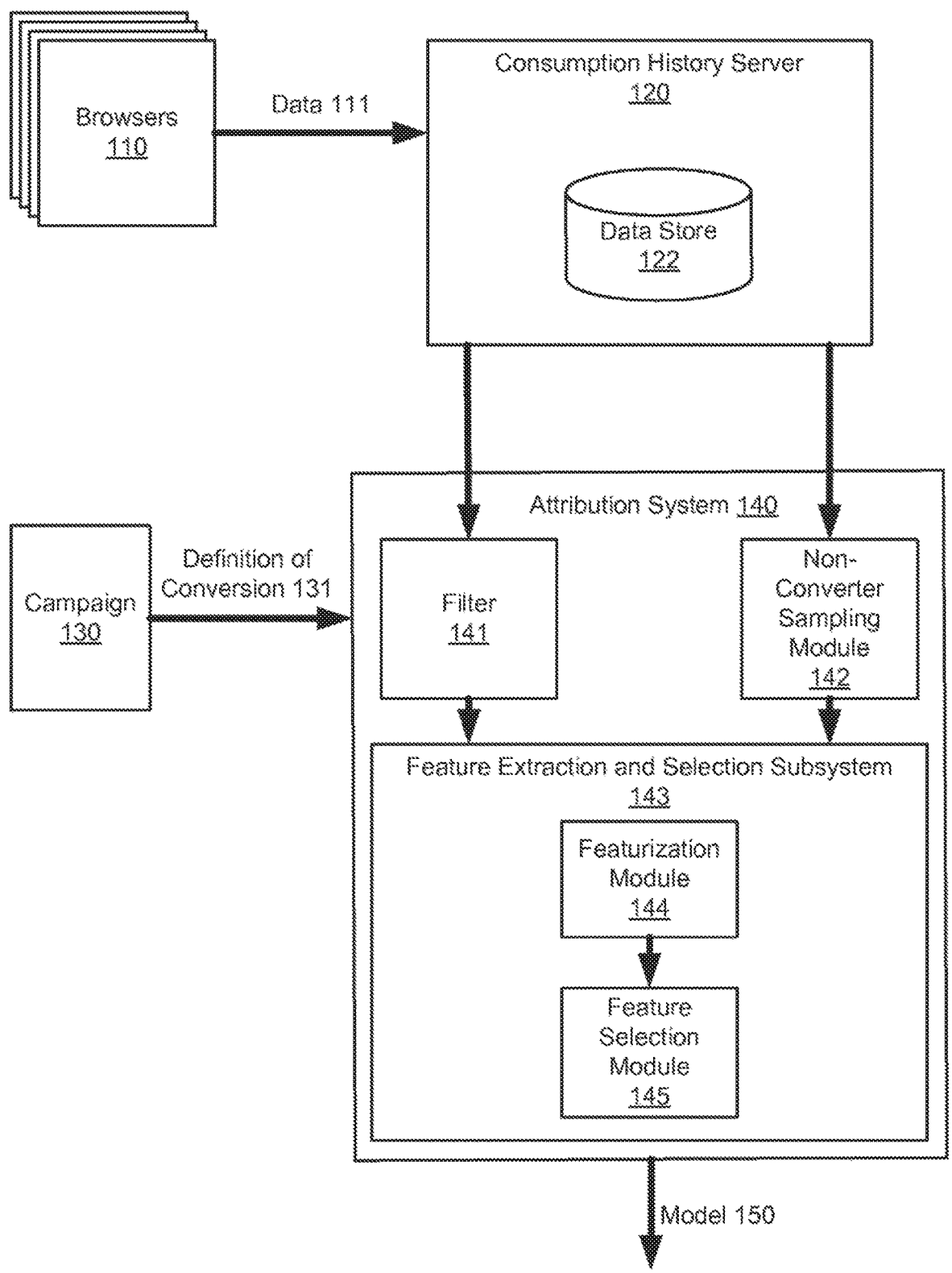
FIG. 1 is a high-level block diagram of a computing environment for building a model, in accordance with an embodiment of the invention.

FIG. 1 is a high-level block diagram of a computing environment for building a model 150, in accordance with an embodiment of the invention. The computing environment includes users' browsers 110, a consumption history server 120, at least one campaign 130, and an attribution system 140.

The users' browsers 110 are web browsers executing on user devices, such as personal computers, laptop computers, tablet computers, and smartphones, as the users of those devices browse the web. As users undertake their normal web browsing activities using the browsers 110, in one embodiment, data 111 for some media consumption events is reported to the consumption history server 120. A media consumption event is the act of accessing content over a network, such as, but not limited to, accessing a web page from a web server. A variety of methods exist for associating an anonymous identifier with a web browser. For example, a hardware device identifier such as a Media Access Control Address (MAC address) which can be stored on a device operated by a user to access content over a network. As another example, a software identifier such as a cookie value can be locally stored. In other embodiments, identifiers can be composed and/or stored remotely from a device associated with the user. In some cases, a browser can have multiple identifiers, such as multiple first party cookies and multiple third party cookies, which can be used to identify the browser to various systems. A direct measurement system can collect and/or receive information for a browser or a system in conjunction with the identifier. In some cases, information collected and/or received by the direct measurement system can be processed before it is stored. For example, when a browser requests content from a content provider, the content provider can re-direct the browser to submit a pixel request to the direct measurement system. Based on the pixel request, and optional subsequent actions and/or interactions, the direct measurement system can collect and/or receive information from the browser in conjunction with an identifier in order to enable the maintenance of a coherent body of information, such as a consumption history, a portion of a consumption history, a consumption history score, a consumption history characterization and/or a consumption history digest, over time.

In the example illustrated in FIG. 1, the consumption history server 120 receives data 111 from the browsers 110. The received data 111 enables the consumption history server 120 to record media consumption events in a data store 122 in conjunction with an anonymous identifier, such as a cookie value. In FIG. 1, data store 122 is shown as internal to the consumption history server 120, but in other implementations, data store 122 may be external to or remote from the consumption history server 120. Also, only one instance of data store 122 is shown in FIG. 1 for clarity, but in practice, the consumption histories may be stored in a plurality of data stores, such as a distributed network of storage facilities.

The campaign 130 is an advertising campaign for which a model for targeting advertisements is to be built. The campaign provides a definition of a conversion 131 to the attribution system 140. The definition of a conversion 131 may be individually set by the campaign manager as an indication of what counts as a success of the campaign. For example, the definition of a conversion 131 for one campaign may be a click-through to a particular website, while the definition of a conversion 131 for another campaign may be a product purchase event, and the definition of a conversion 131 for yet another campaign may be the completion of a registration form. In one embodiment, the definition of conversion 131 is made with reference to an observable media consumption event. Thus, by analyzing consumption history data, converters can be distinguished from non-converters. In one variation, a campaign 130 may also send a definition of non-converters (e.g., defining non-converters as visitors to a website that did not purchase a product, versus defining a non-converter as not having met the definition of conversion), and/or other attributes (such as geographic attributes, computer attributes, or any other type of attributes) to use to filter the data stream before building the model. For example, a campaign may indicate a geographic area for which they want a model for targeting advertisements, where only converters and non-converters from that area are used to build the model. Thus, a geo filter (not shown) can be applied to the data stream by the attribution system 140 at any point before the data stream is fed to the feature extraction and selection subsystem 143.

The attribution system 140 receives consumption histories from the consumption history server 120 and the definition of conversion 131 from the campaign 130 for use in building the model 150. Although as illustrated in FIG. 1, the data 111 is streamed first to the consumption history server, and the consumption histories are then provided to the attribution system 140, in another variation, the data 111 may also be streamed directly to the attribution system 140 which can perform the function of matching the streaming data 111 to the consumption histories that are needed to build the model. The attribution system 140 includes a filter 141, a non-converter sampling module 142, and feature extraction and selection subsystem 143.

In one embodiment, the filter 141 of the attribution system 140 uses the definition of a conversion 131 to identify converters from the consumption history data. For example, if the definition of conversion 131 is a visitation of a website, analyzing the consumption history data would reveal the status of a converter or non-converter. In other cases, the attribution system 140 may receive a signal from the conversion event directly, and thus no filtering need be applied to determine conversion status, but the attribution system 140 may still access the corresponding consumption history from the consumption history server 120 in this scenario.

The non-converter sampling module 142 of the attribution system 140 randomly samples non-converters. In practice, the numbers of non-converters can dwarf the numbers of converters for any given campaign. Thus, it is not practical or efficient to analyze all non-converters. The non-converter sampling module 142 randomly samples enough non-converters to keep the ratios between converters and non-converters computationally reasonable, such as 1 to 1 or 1 to 5, but other larger ratios may also be used.

Figure 3:
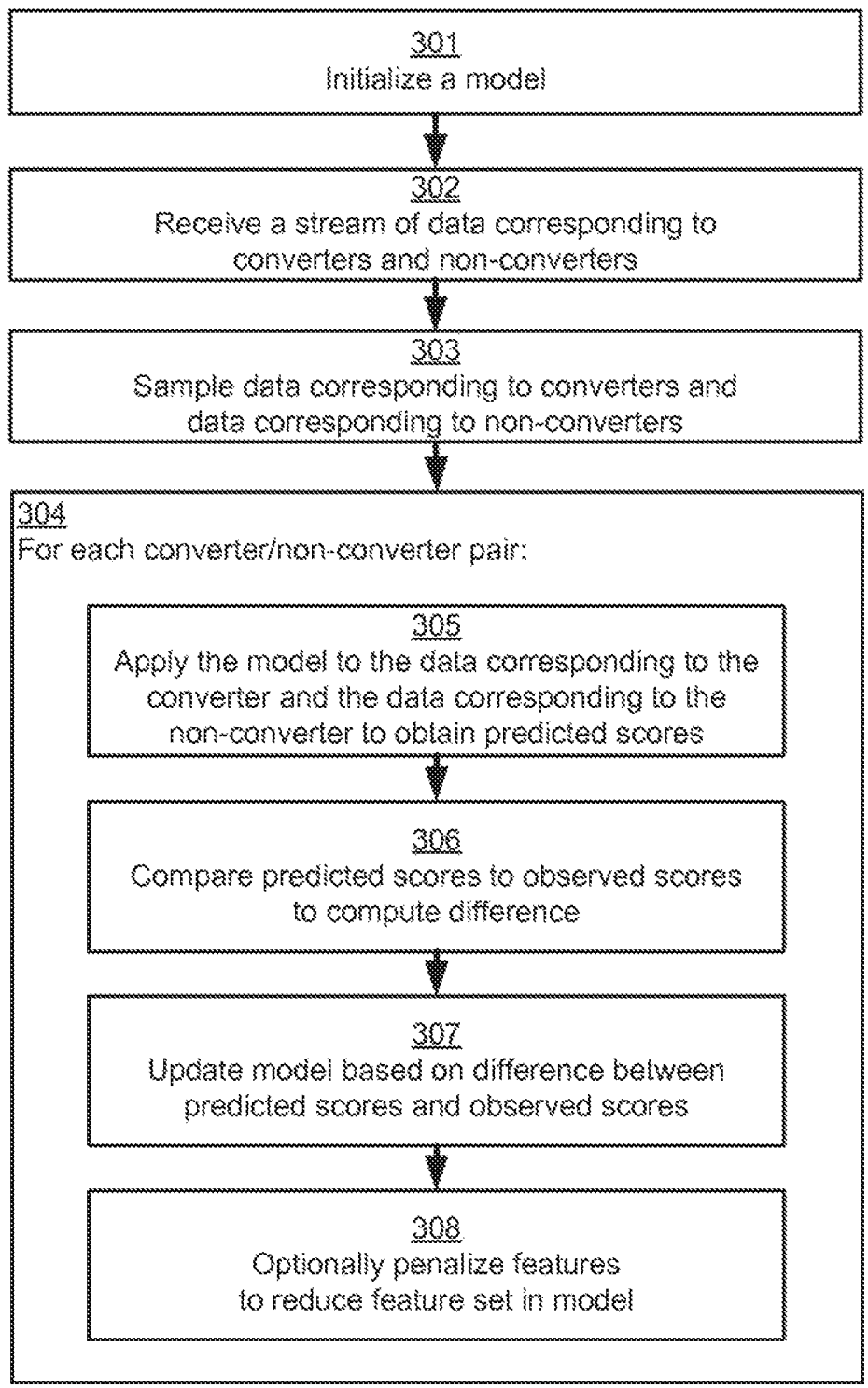
FIG. 3 is a flow chart illustrating a method performing incremental model training using streaming data, in accordance with an embodiment of the invention.

The feature extraction and selection subsystem 143 optionally extracts and selects features from the consumption histories of the converters and non-converters that are the most strongly correlated to the status of a converter or non-converter. The feature extraction and selection subsystem 143 includes a featurization module 144 and a feature selection module 145. The featurization module 144 translates the consumption history into a set of many features. For example, the features of a consumption history may include websites visited, keyword searches entered, online purchases made, geographic location, topics from past ad opportunities, type of browser, etc. Then, the feature selection module 145 optionally determines which features are most strongly correlated with being a converter or a non-converter, and uses those features to form a model 150. FIG. 3, described in more detail below, illustrates one method of building a model for advertising targeting by iteratively penalizing features to reduce the feature set in the model. In other embodiments, feature selection need not be performed, particularly if there are no limitations on storage space for models.

For clarity, FIG. 1 has illustrated only one instance of a campaign 130, and only one instance of an attribution system 140. In practice, many campaigns may be simultaneously active, and models may be built for each of them. Moreover, for any one campaign, to take advantage of parallel processing, and for speed in developing and updating models, a stream of data may be split and diverted to multiple attribution systems 140, each building a model from the converter and non-converter histories that have been routed to it. For example, the model can optionally be separately built and updated on multiple servers, for example each located in relative proximity to an advertising exchange, in order to support bidding on advertising opportunities in a real-time bidding environment. Even in instances where the models are built separately, periodically, the models may be synchronized, reconciled, or combined, for example every few hours or at the end of the day, or on another schedule, to prevent them from diverging too greatly, and to ensure that all models are benefiting from recent improvements to the models. In other embodiments, the models are not combined, in order to preserve the existence of differing regional trends experienced by subsets of the geographically dispersed servers.

Figure 2:
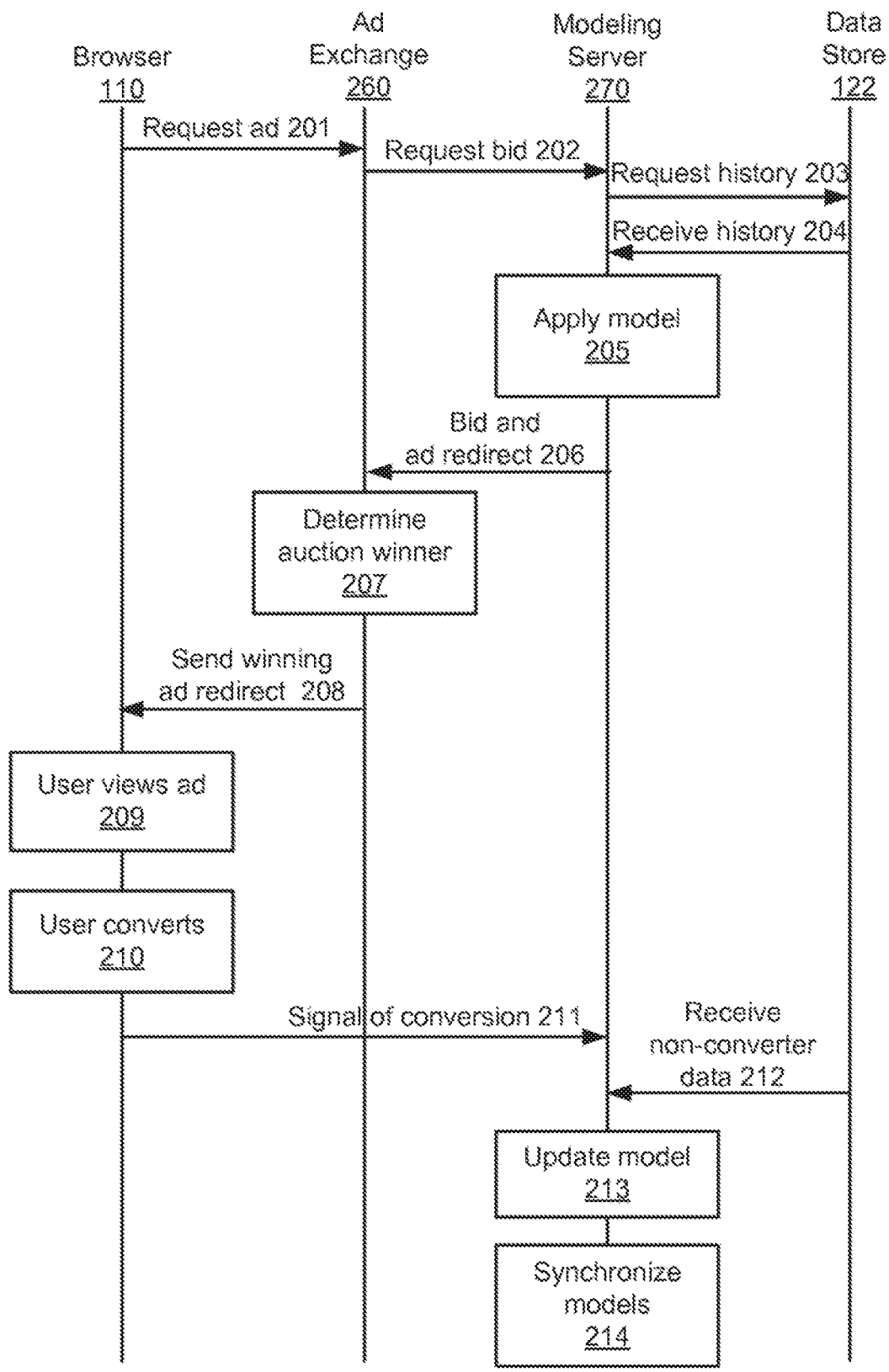
FIG. 2 is an interaction diagram illustrating incrementally updating a model for advertisement targeting, in accordance with an embodiment of the invention.

FIG. 2 is an interaction diagram illustrating applying and incrementally updating a model for advertisement targeting in the context of a real-time bidding environment of an ad exchange 260, in accordance with an embodiment of the invention. It is noted that FIG. 2 is merely illustrating an example of a real-time bidding environment, and the interactions depicted in FIG. 2 may vary in other examples.

In the scenario illustrated in FIG. 2, as a user operates browser 110 and navigates to a publisher's website that includes ad slot to be auctioned in an ad exchange 260, the publisher's web server sends instructions to the browser 110 for accessing content to be displayed on the website, including a coded link known as an "ad tag" that points to an advertisement exchange 260. The browser 110 uses the ad tag to contact the advertisement exchange 260 with a request for an ad in step 201.

The ad exchange 260 receives the request for the ad from the browser 110 and reads the identifier. In response, the ad exchange starts the auction in step 202 by sending a bid request to the modeling server 270 and to other servers to notify potential bidders of the bidding opportunity. Included with the bid request is the identifier and other data describing the bid opportunity, such as, for example, the URL on which the ad will be delivered, the topic of the webpage on which the ad will appear, site visit frequency, and/or the dimensions of the ad slot.

The modeling server 270 receives the request for the bid 202, and may match the identifier delivered from the ad exchange 260 to the modeling server's own corresponding identifier that is linked to a rich set of data, such as the consumption history. In one embodiment, to access the consumption history, the modeling server 270 requests it from the data store 122 in step 203 and receives it from the data store 122 in step 204.

In step 205, an advertising targeting model is applied to determine the value of the bid opportunity based on a plurality of features. As discussed above, the features include information that is known or can be inferred from elements of the consumption history. Depending on the implementation of the model, the output of the model may be a score, a percentage likelihood, a binary result, or other indication of whether the bid opportunity is valuable to an advertising campaign. In some cases, the indication of value output by the model is then translated into a bid amount at the modeling server 270.

If the bid opportunity is judged valuable, in step 206, the modeling server 270 submits to the ad exchange 260 a bid amount and an ad redirect to send to the browser 110 should the bid win the auction. The ad redirect provides instructions for redirecting the browser to a server that will serve the ad for the advertising campaign that submitted the winning bid.

In step 207, the ad exchange 260 determines the auction winner from the submitted bids. In some implementations, the ad exchange 260 may send a notification to the winner and/or the other bidders. The notification may include an indication of whether the bidder won the auction, and may confirm the amount that the winner will be charged for buying the ad placement, which is some cases is the amount of the second highest bid.

In step 208, the ad exchange 260 sends the ad redirect included with the winning bid to the browser 110. The browser 110 uses the ad redirect to access the ad so that the user can view the ad in step 209.

If the advertisement was successful, in step 210 the user converts. As discussed above, the definition of conversion may differ between campaigns, but generally involves the user taking some desirable and observable action within a particular time frame. Depending on the definition of conversion, the conversion event need not occur immediately after viewing the ad, and may be offset in time from viewing the ad (e.g., by minutes, hours, days, etc.) and still be counted as a conversion provided that it occurs within the provided time frame, referred to as a conversion window. In step 211, the signal of conversion can be directly or indirectly conveyed from the browser 110 to the modeling server 270. The signal of conversion may include details of the conversion activity, but importantly, the modeling server 270 can use the newly received converter data along with non-converter data received from data store 122 in step 212 to update the model for targeting advertisements in step 213. The process for updating the model will be described below in more detail with reference to FIG. 3.

In some implementations, the process illustrated in steps 201 through 213 of FIG. 2 can be executed in a few seconds. Ideally, the time passage between the browser 110 requesting the ad in step 201 and the user viewing the ad in step 209 is short enough not to impact the user's enjoyment of the publisher's website that the user is browsing. In other words, there is no noticeable lag to download and display the appropriate ad of the winning bidder in the auction. The time period between the user viewing the ad in step 209 and converting in step 210 may be variable, but steps 211 through 213 can be completed in rapid succession once the user converts. Thus, the model at the modeling server 270 is refreshed very quickly with the most recent data.

Lastly, in step 214, if there are a plurality of models corresponding to the same ad campaign existing at various modeling servers 270, the models can be synchronized 214, for example by reconciling or combining the models, every few hours, or at the end of the day, or on another schedule, to prevent them from diverging too greatly from one another. The combination of models may be performed, for example, by averaging the models, or by taking a weighted average of the models based on the amount of converters recently incorporated into the models. The amount of converters experienced by individual modeling servers 270 may vary greatly, so the synchronization process ensure that all models are benefiting from recent improvements to the models, and none of the models become too stale.

FIG. 3 is a flow chart illustrating a method performing incremental model training using streaming data, in accordance with an embodiment of the invention. In some implementations, the steps are performed in an order other than the order presented in FIG. 3, and in other implementations, additional or alternative steps may be performed.

In step 301, a model is initialized for an advertising campaign, such as campaign 140. In some implementations, the model may be set to null at the beginning, or a preformed model may be accessed to initialize the model so that some starting set of features and a respective weight associated with each of the features is present.

In step 302, a stream of data corresponding to converters and non-converters is received. In some implementations, the stream data corresponding to converters and non-converters is received at a central attribution system 140 that will process the entire stream, and in other implementations, the stream of data corresponding to converters and non-converters is split into a plurality of smaller streams that are directed to different machines, such as modeling servers 270, for processing.

In step 303, data corresponding to converters and data corresponding to non-converters are sampled. Generally, there are expected to be many more non-converters than converters in the streaming data. Thus, in some embodiments, it is desirable to downsample from the data corresponding to non-converters to avoid overwhelming the data corresponding to the converters, and in other embodiments, the data corresponding to converters are oversampled to provide an appropriate balance of converters and non-converters, such as a ratio of 1 to 1, 1 to 5, or other ratios. Downsampling the non-converters is most important in implementations where the feature set of the model is very large. In these cases, if there are too many non-converters, the model performance will degrade and it consumes extra time to analyze each extra non-converter, which are both negative outcomes. Downsampling the non-converters is not as important when a limited number of features are in the feature set of the model, because the model performance is unlikely to significantly degrade, even though it still consumes extra time to analyze each extra non-converter. Generally, it can be determined if the sampling rate from the non-converters is too high by analyzing how different sampling rates affect model performance. At the point where an increase in sampling rather leads to a decrease in performance, the non-converters are being over-sampled.

In step 304, for each converter and non-converter pair, or other small grouping of a converter and non-converters from the sampling ratio determined in step 303, the following steps 305-307 are performed. Optionally step 308 is also performed.

In step 305, the existing model is applied to the data corresponding to the converter and the data corresponding to the non-converter to obtain predicted scores. Applying the model may include comparing features in the consumption histories of the converter and the non-converter to the feature set in the model to make a prediction as to whether the converter and the non-converter are likely to convert. In this scenario, a perfect model should predict, for example, a score of 1 for the converter and a score of 0 for the non-converter, because it is known that the observed score of the converter is 1 and the observed score for the non-converter is 0.

In step 306, the predicted scores are compared to the observed scores to compute the difference between them. This is a measure of how accurately the model predicted the outcome that the converter would convert and the non-converter would not convert based on the feature set in the model. The larger the difference is between the predicted scores and the observed scores, the greater the effect the new data should have on the model in modifying it.

In step 307, the model is updated based on the differences between the predicted scores and the obtained scores. In one implementation, the difference represents the magnitude by which the model should be updated. By updating the model based on the differences, the intent is to have the updated model converge upon the ultimate perfect incarnation of the model that can predict a conversion with near certainty. Accurate models are highly desirable to advertisers who use models to target their advertisements. They ensure the advertiser is receiving the most return on their investment in advertising by maximizing the likelihood of conversions.

In optional step 308, a penalty is assessed against features of the model that are not frequently occurring in the data. One method of assessing a penalty is to apply regularization to prune features from the model. One implementation of the regularization process sets any value that is below a certain low threshold to zero. This ultimately saves processing resources, including time, by ignoring the feature in future incremental updates. The optional penalization step 308 need not be applied in every iteration to prune features from the model, and may optionally be applied after every few iterations or on another schedule.

Alternatively, to control the number of features in the model, the number of features can be enforced when building the model through a bucketing process. For example, for a model where only 1000 features are desired, each existing feature in randomly bucketed into a bucket from 1 to 1000. If there are several thousand features, each bucket is likely to contain several features. The features in the bucket are then randomly clustered. The model learns over time whether the combination of features in a particular bucket is important. This methodology relies on the fact that only a small percentage of features are important in predicting the likelihood of conversion from the total number of features. In general, the number of important features should be in proportion to the total number of features. An example of the bucketing technique is described in more detail in "Collaborative Email-Spam Filtering with the Hashing-Trick" by J. Attenberg et al., Sixth Conference on Email and Anti-Spam (CEAS) 2009, which is incorporated herein by reference in its entirety.

As a final optional step, the data temporarily present at modeling servers 270 corresponding to the converter and the non-converter that were used to update the model at the respective modeling server 270 may be discarded. Because the models are being incrementally updated rather than iteratively re-built from scratch, in some embodiments of the invention, there is no need to persistently maintain the data at the modeling server 270. By discarding the data that has been absorbed into the model, storage space is conserved at the modeling server 270, which may be particularly important when processing high volumes of data corresponding to converters and non-converters on machines with limited capacities.

Physical Components of a Computer

Figure 4:
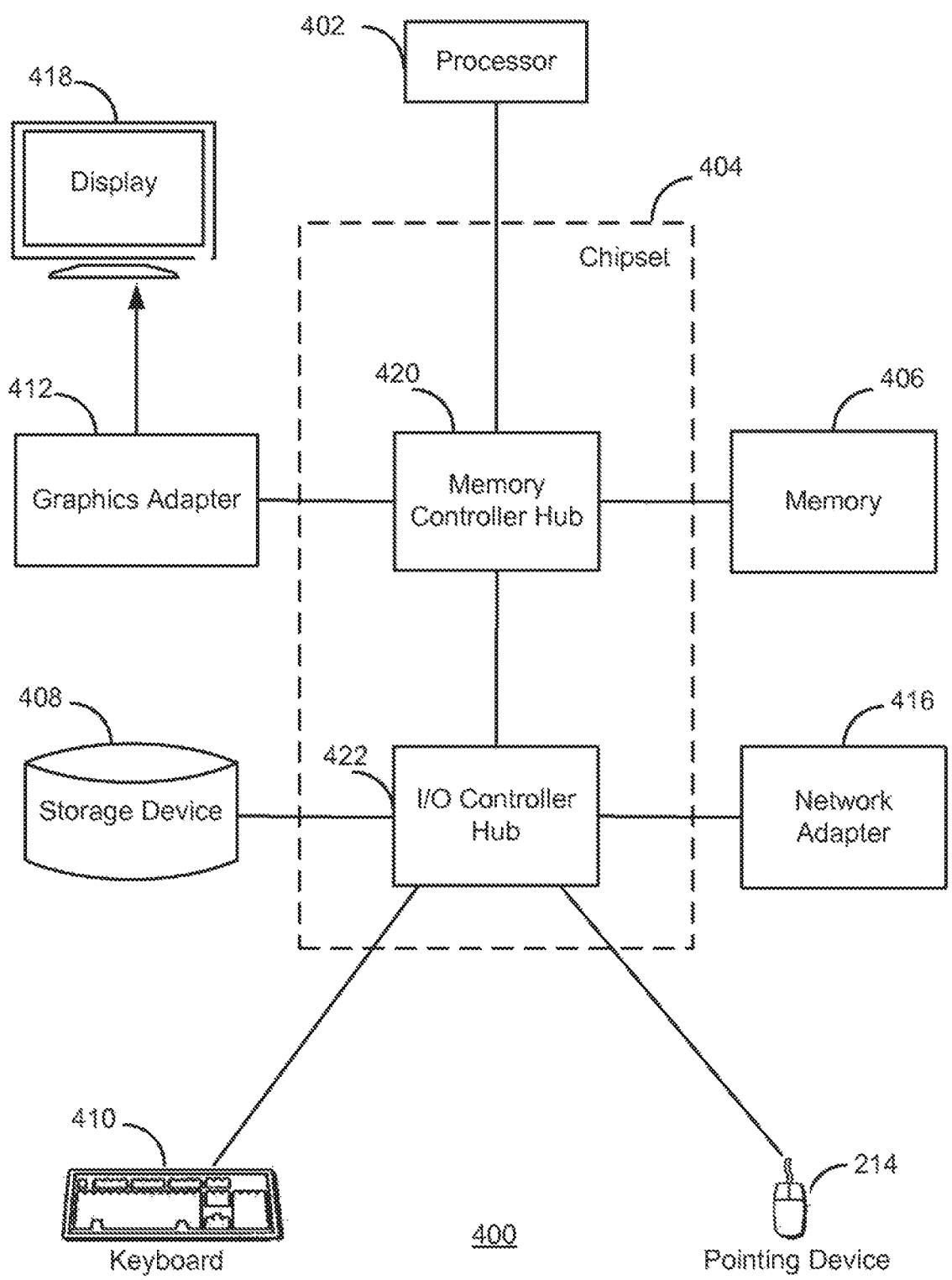
FIG. 4 is a high-level block diagram of the components of a computing system for use, for example, as the server or system depicted in FIG. 1, in accordance with an embodiment of the invention.

FIG. 4 is a high-level block diagram of the components of a computing system 400 for use, for example, as the server 120 or the attribution system 140 depicted in FIG. 1, in accordance with an embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer 400 to a network.

As is known in the art, a computer 400 can have different and/or other components than those shown in FIG. 4. In addition, the computer 400 can lack certain illustrated components. In one embodiment, a computer 400 acting as a server may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for performing incremental model training for targeting advertisements using streaming data. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method comprising:
responsive to receiving a signal of conversion corresponding to a converter at a first modeling server of a distributed modeling system comprising a plurality of modeling servers, pairing the converter and a non-converter and performing for the converter and the non-converter:
applying a model at the first modeling server to data corresponding to the converter to obtain a predicted score for the converter;
applying the model to data corresponding to the non-converter to obtain a predicted score for the non-converter;
comparing the predicted score for the converter to an observed score for the converter to compute a first difference;
comparing the predicted score for the non-converter to an observed score for the non-converter to compute a second difference; and
updating the model at the first modeling server based on the first and second differences when the first difference exceeds a threshold;
combining the updated model with at least one other model from at least a second modeling server of the distributed modeling system; and
redistributing the combined model to at least the first and second modeling servers of the distributed modeling system.

2. The method of claim 1, wherein at least the applying, comparing, and updating steps are performed by a plurality of modeling servers concurrently on data corresponding to different converters.

3. The method of claim 1, wherein combining the updated model with at least one other model from at least a second modeling server comprises taking a weighted average of the models based on respective amounts of converters recently incorporated into each model.

4. The method of claim 1, further comprising downsampling data corresponding to non-converters.

5. The method of claim 1, wherein the model comprises a feature set and a respective weight for each feature in the feature set.

6. The method of claim 5, further comprising penalizing infrequently observed features to reduce the feature set in the model.

7. The method of claim 1, further comprising discarding the data corresponding to the converter and the data corresponding to the non-converter.

8. A non-transitory computer readable storage medium executing computer program instructions, the computer program instructions comprising instructions for:
responsive to receiving a signal of conversion corresponding to a single converter at a first modeling server of a distributed modeling system comprising a plurality of modeling servers, pairing the converter and a non-converter and performing for the converter and the non-converter:
applying a model at the first modeling server to data corresponding to the converter to obtain a predicted score for the converter;
applying the model to data corresponding to the non-converter to obtain a predicted score for the non-converter;
comparing the predicted score for the converter to an observed score for the converter to compute a first difference;
comparing the predicted score for the non-converter to an observed score for the non-converter to compute a second difference;
and updating the model at the first modeling server based on the first and second differences when the first difference exceeds a threshold;
combining the updated model with at least one other model from at least a second modeling server of the distributed modeling system; and
redistributing the combined model to at least the first and second modeling servers of the distributed modeling system.

9. The medium of claim 8, wherein combining the updated model with at least one other model from at least a second modeling server comprises taking a weighted average of the models based on respective amounts of converters recently incorporated into each model.

10. The medium of claim 8, further comprising instructions for downsampling data corresponding to non-converters.

11. The medium of claim 8, wherein the model comprises a feature set and a respective weight for each feature in the feature set.

12. The medium of claim 11, further comprising instructions for penalizing infrequently observed features to reduce the feature set in the model.

13. The medium of claim 8, further comprising instructions for discarding the data corresponding to the converter and the data corresponding to the non-converter.

14. A system comprising:
a processor;
a computer readable storage medium storing processor-executable computer program instructions, the instructions comprising instructions for:
responsive to receiving a signal of conversion corresponding to a converter at a first modeling server of a distributed modeling system comprising a plurality of modeling servers, pairing the converter and a non-converter and performing for the converter and the non-converter:
applying a model at the first modeling server to data corresponding to the converter to obtain a predicted score for the converter;

applying the model to data corresponding to the non-converter to obtain a predicted score for the non-converter;

comparing the predicted score for the converter to an observed score for the converter to compute a first difference;

comparing the predicted score for the non-converter to an observed score for the non-converter to compute a second difference; and updating the model at the first modeling server based on the first and second differences when the first difference exceeds a threshold;

combining the updated model with at least one other model from at least a second modeling server of the distributed modeling system; and redistributing the combined model to at least the first and second modeling servers of the distributed modeling system.

15. The system of claim 14, wherein combining the updated model with at least one other model from at least a second modeling server comprises taking a weighted average of the models based on respective amounts of converters recently incorporated into each model.

16. The system of claim 14, the medium further comprising instructions for downsampling data corresponding to non-converters.

17. The system of claim 14, wherein the model comprises a feature set and a respective weight for each feature in the feature set.

18. The system of claim 17, the medium further comprising instructions for penalizing infrequently observed features to reduce the feature set in the model.

19. The system of claim 14, the medium further comprising instructions for discarding the data corresponding to the converter and the data corresponding to the non-converter.

* * * * *